United States Patent [19]

Cramer et al.

[11] Patent Number: 4,464,259

[45] Date of Patent: Aug. 7, 1984

[54] HYDRAULIC HORIZONTAL MIXER

[75] Inventors: Roy A. Cramer; Barry G. Cramer, both of Kansas City, Mo.

[73] Assignee: Air-O-Lator Corporation, Kansas City, Mo.

[21] Appl. No.: 430,719

[22] Filed: Sep. 30, 1982

[51] Int. Cl.³ ............................................... C02F 3/02
[52] U.S. Cl. .................................... 210/219; 210/220; 210/236; 210/237; 210/170; 366/286; 416/171; 261/91
[58] Field of Search ..................... 210/219, 220, 242.2, 210/170, 173, 174, 628, 629, 237; 366/286; 416/171; 261/91; 486/669

[56] References Cited

U.S. PATENT DOCUMENTS

| 1,237,222 | 8/1917 | Schroder | 366/286 |
| 3,366,183 | 1/1968 | Wolfe | 416/171 |
| 3,547,556 | 12/1968 | Keene | 416/171 |
| 3,759,495 | 9/1973 | Boler et al. | 261/92 |
| 3,846,042 | 11/1974 | Keene | 416/171 |
| 4,007,120 | 2/1977 | Bowen | 210/170 |
| 4,043,909 | 8/1977 | Endo et al. | 210/120 |
| 4,216,091 | 8/1980 | Mineau | 210/219 |
| 4,358,298 | 11/1982 | Ratcliff | 366/286 |

FOREIGN PATENT DOCUMENTS 2742559 10/1978 Fed. Rep. of Germany ...... 416/171

Primary Examiner—Ernest G. Therkorn
Assistant Examiner—John Donofrio
Attorney, Agent, or Firm—Litman, Day & McMahon

[57] ABSTRACT

A hydraulically powered mixing aerator rides on an upright beam member for submersion in a body of water such as an equalization basin, oxidation ditch or sludge holding tank used in sewage treatment plants. The aerator employs a submersible, hydraulically powered mixing motor driving a propeller which is mounted on the beam member by a slidable bracket for height adjustment. The beam member is swingably supported to allow adjustment of the vertical plane angle. Because the beam member is also mounted for rotation, substantially any attitude or position of the mixer can be selected for creating an efficient flow pattern within the body of water. The speed at which the propeller is rotated, and therefore, the rate at which the water is circulated and aerated, is selectively adjustable. The hydraulically driven motor provides for a low speed and high torque rotation of the propeller without the use of a reduction gear.

6 Claims, 5 Drawing Figures

HYDRAULIC HORIZONTAL MIXER

This invention relates to mixing devices in general and in particular to a hydraulically powered mixing aerator for circulating fluid in a sewage treatment facility and facilitating aeration.

BACKGROUND OF THE INVENTION

In the mixing of large bodies of liquid, several different types of mixers have been used, such as water floats and pumps. Generally, the flotation type is not sufficiently controllable in all directions of flow for efficient mixing. Further, pumps and the like are susceptible to clogging and often do not provide sufficient rate of flow for the efficient mixing required in equalization basins, as well as oxidation ditches, sludge holding tanks and other special applications. Mixers are also used in aerated lagoons in which active biological solids are in equalibrium with an applied waste. The basin is of sufficient depth, normally six to twelve feet, and oxygen is furnished by mechanical aeration to create a turbulence level sufficient to provide adequate liquid mixing. As a result of mixing, uniform distribution of the waste and dispersion of the oxygen is achieved and rapid and efficient waste biodegradation occurs.

Mixers such as the Flygt 4500 submersible mixer have been employed with generally acceptable results for mixing in tanks, ponds and lagoons. These mixers are generally powered by electric motors. A problem with electric motors is that they usually require the use of a reduction gear in order to provide efficient propeller operation. Also they are sensitive to electrical current fluctuations, for example, lightning strikes, which can destroy expensive circuitry.

Electric motors are also not easily adaptable to use in submersion in bodies of liquid. The motors tend to leak after continued use, and the liquid may enter the motor housing through worn bearings and seals and cause damage to the internal parts. Even the best submersible electric motors with expensive seals and moisture proofing will tend to leak after extended use.

OBJECTS OF THE INVENTION

The principal objects of the present invention are: to provide a mixing aerator which can be easily adjusted to any depth within a tank; to provide such a mixing aerator which can be easily adjusted to any horizontal angle or azimuth; to provide such a mixing aerator with an adjustable tilt angle; to provide such a mixing aerator which has a submersible motor powered hydraulically, thereby providing for a low speed and high torque rotation of a submersed propeller without the need of a reduction gear; to provide such a mixing aerator which can be easily and inexpensively controlled in speed of operation and mixing; to provide such a mixing aerator which increases the degree and uniformity of mixture in a tank, basin, ditch and the like; to provide such a mixing aerator with an internally pressurized submersible motor which is not subject to extensive damage when small leaks form therein; and to provide such a mixing aerator which is sturdy and efficient in use and particularly well adapted for its intended purpose.

Other objects and advantages of this invention will become apparent from the following description taken in conjunction with the accompanying drawings wherein are set forth, by way of illustration and example, certain embodiments of this invention.

DESCRIPTION OF THE PREFERRED EMBODIMENT

Figure 1:
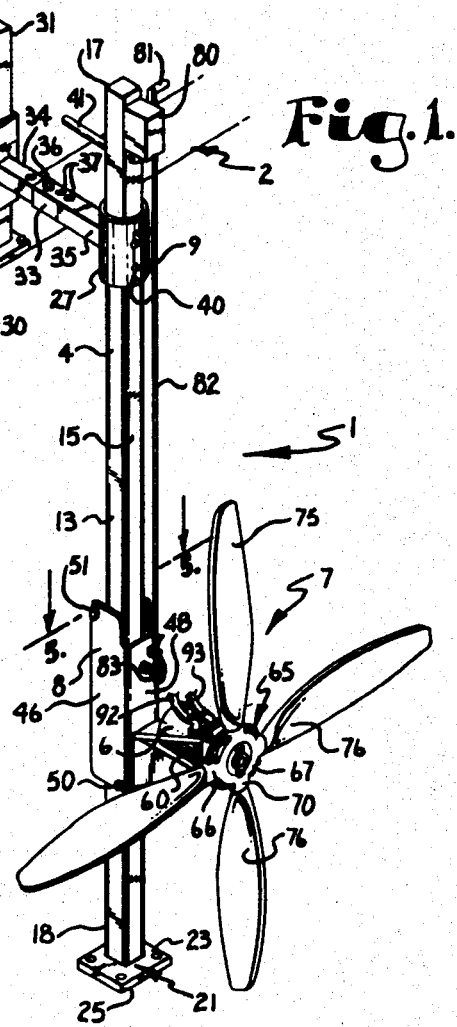
FIG. 1 is a perspective view of a hydraulic horizontal mixer embodying the present invention and is shown emplaced within a sewage treatment basin.
Figure 2:
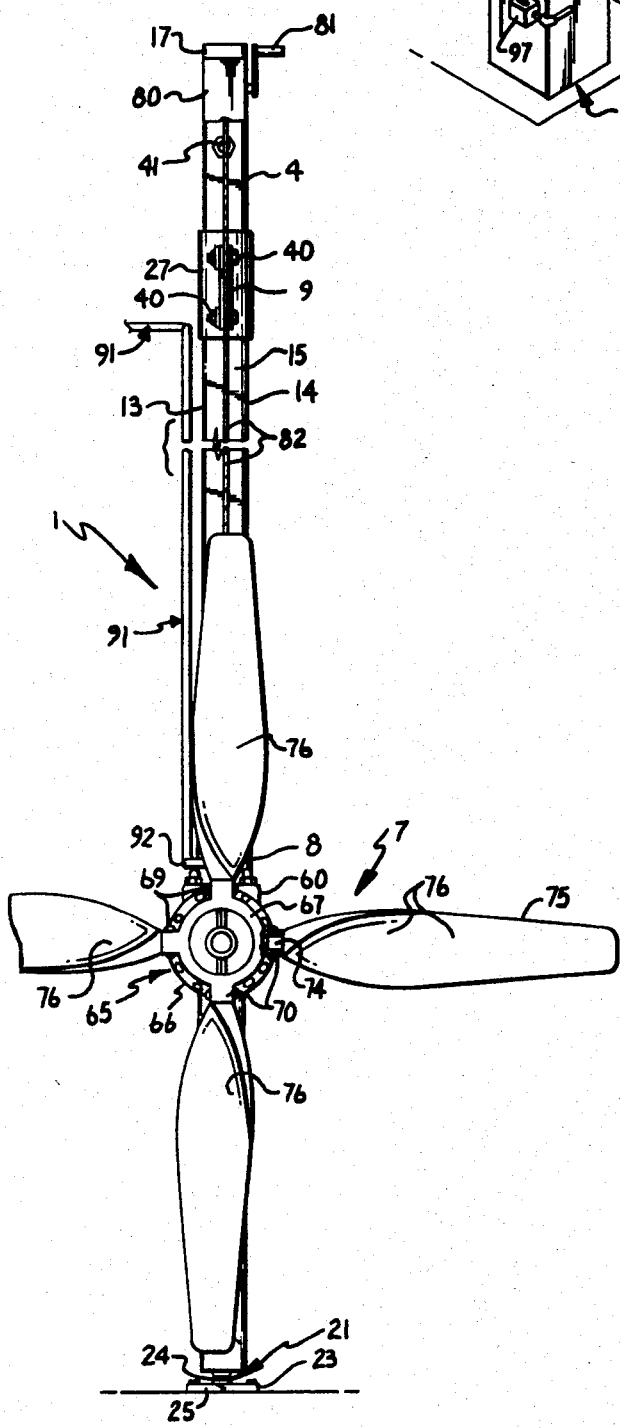
FIG. 2 is a front elevational view of the hydraulic horizontal mixer.
Figure 4:
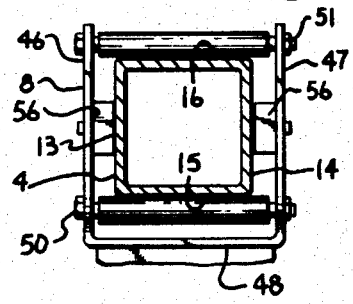
FIG. 4 is a cross sectional view taken along lines 4—4, FIG. 1.
Figure 3:
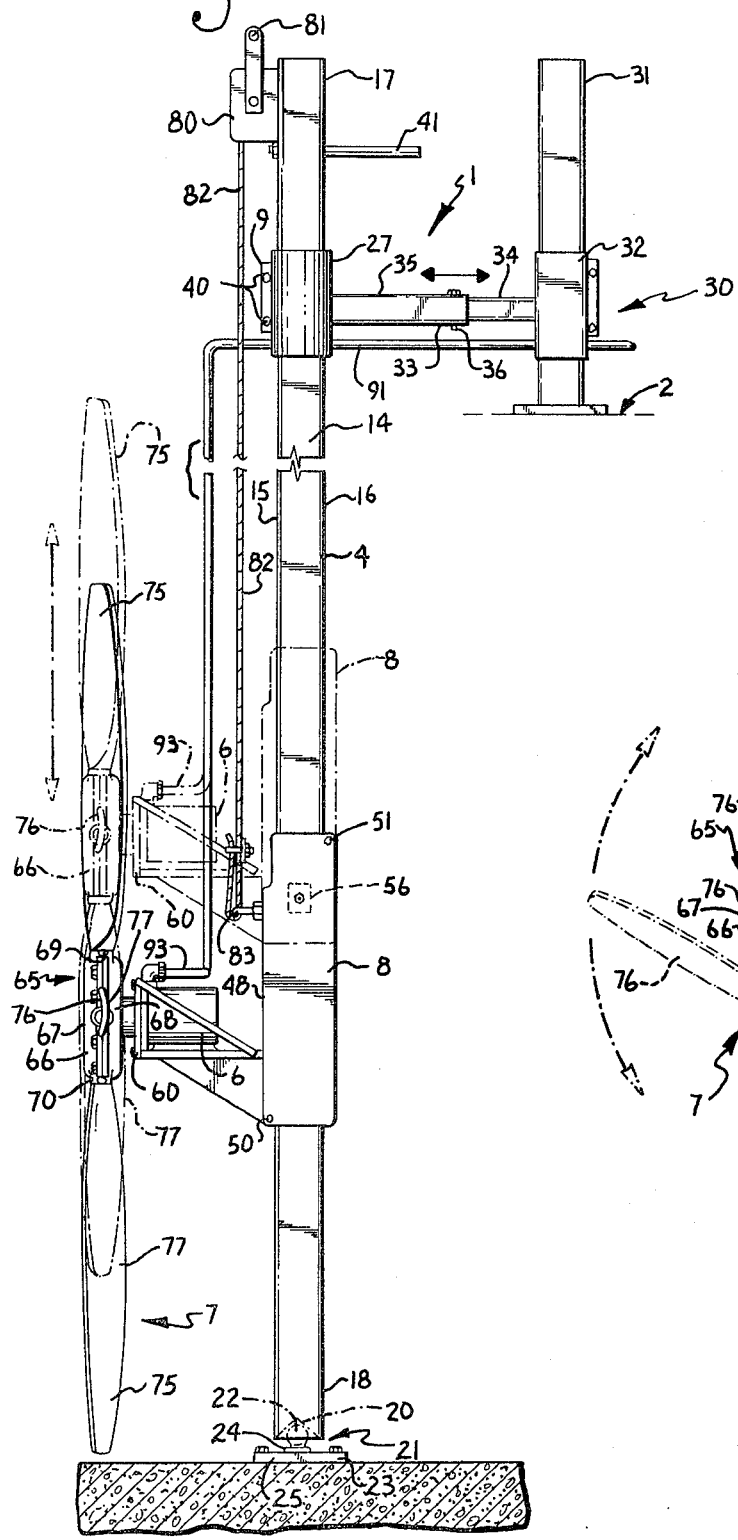
FIG. 3 is a side elevational view of the hydraulic horizontal mixer.
Figure 5:
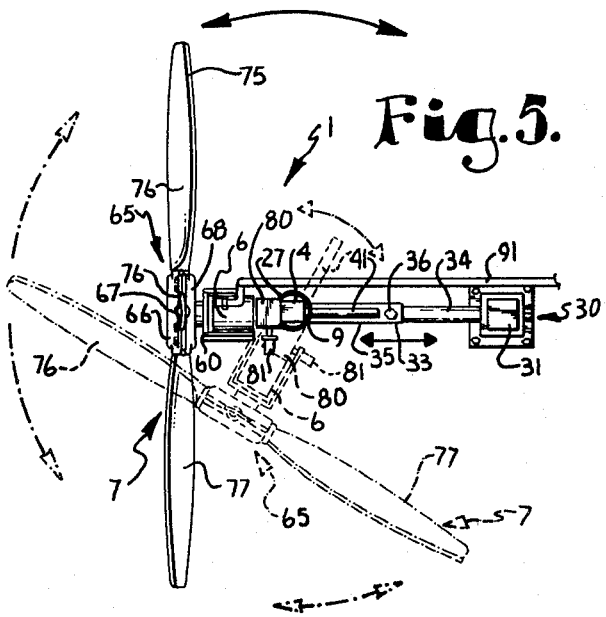
FIG. 5 is a plan view of the mixer showing variations in azimuth of propulsion.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring more in detail to the drawings:

The reference numeral 1 generally indicates a mixing aerator embodying the present invention. In overview, the aerator 1 generally depends from a catwalk 2 extending over a portion of a sewage treatment tank or similar liquid treatment facility. The aerator 1 includes an upright beam member or post 4 supported near the top and bottom ends and which extends into a body of liquid underneath the catwalk 2. A hydraulic power unit 5 includes a submersible hydraulically driven motor 6 driving a propulsion means such as a propeller 7 to create a mixing flow or current within the body of liquid. The hydraulically driven motor 6 is connected to the upright beam member or post 4 by a bracket 8 which is vertically movable on the upright beam member or post 4 in order to adjust to a selected height.

Further, the upright beam member or post 4 is rotatably supported by means of a clamp 9 providing for controlling azimuth of the path of fluid flow from the power unit 5.

The exemplary upright beam member or post 4 is of square tubing structural steel having opposite side surfaces 13 and 14 and front and rear surfaces 15 and 16. The beam member or post 4 has opposite upper end and bottom end portions 17 and 18 with the upper end portion 17 extending above the surface of the liquid being treated when the hydraulically powered mixing aerator 1 is in use. Pivot means are mounted at the upper and bottom end portions 17 and 18 and enable rotation about the longitudinal axis of the upright beam member or post 4 for adjusting the azimuth or direction of thrust of the hydraulically driven motor 6.

For the lower pivot means, a ball pivot is preferably employed, which includes a concave wall within the bottom end portion 18, such as of converging pyramidal shape 20 into which is received an upstanding ball pivot 21. The ball pivot 21 includes a circular ball head 22 supported upon a base member 23 including an upwardly extending truncated cone portion 24 and the surrounding flange 25.

The upper rotating means includes a tubular clamp 9 suitably supported in an upright relationship by structures set forth below and retaining a portion of the beam member post 4 therein by a clamping engagement with the edges of the tubular beam member or post 4. A support structure 30 holds the tubular clamp 9 in an upright position. The support structure 30 includes an anchoring post 31 supporting a tubular bracket 32. Extending outwardly from the tubular bracket 32 is a telescoping support arm 33 comprising two telescoping portions 34 and 35. The tubular clamp 27 is connected to one end of the telescoping portion 35. A pin 36 provides for a selective adjustment of the tilt angle of the beam member or post 4 by extension through selected apertures 37 in the telescoping portions 34 and 35 of the support arm 33.

The tubular clamp 9 is selectively opened and closed by adjustment of bolts 40. When bolts 40 are loosened, the clamp 9 releases its grip on the beam member or post 4 and permits rotation of the beam member post 4 into a desired azimuth. Rotation of the beam member or post 4 is facilitated by rotating a tiller or handle 41. When bolts 40 on the tubular clamp 9 are tightened, the tubular clamp 9 engages the edges of the post 4 and prevents rotation thereof.

The hydraulically driven motor 6 is mounted to the upright beam member or post 4 by the bracket 8. The exemplary bracket 8 is U-shaped to embrace the opposite side walls 46 and 47 and the front end wall 48. The bracket 8 is preferably movably engaged with the beam member or post 4, is of a transverse dimension greater than the beam member 4 and includes means facilitating sliding action, such as guide pins. In the illustrated example, the bracket 8 is fitted with front and rear guide pins 50 and 51. Each of the guide pins 50 and 51 is an elongate bolt of suitable diameter to provide relatively smooth, catch-free sliding upon the front and the rear surfaces 15 and 16 of the beam member post 4. Additionally, slides or bumpers 56, such as of nylon, are interposed between the bracket side walls 46 and 47 and the beam member side wall surface 13 and 14.

The hydraulically driven motor 6 is mounted to the bracket 8 and extends outwardly therefrom. In the illustrated example, the hydraulically driven motor 6 is connected to a mounting block 60 secured as by welding to the front end wall 48 of the bracket 8. The motor 6 is mounted upon the block 60 as by bolts or the like and extends outwardly therefrom at a right angle to the bracket 8. A propeller and spider assembly 65 is connected to the hydraulically driven motor 6 and provides a circulating flow in the liquid when rotated by the hydraulically driven motor 6. The propeller and spider assembly 65 comprises a spider bracket 66 having a front housing half 67 and a rear housing half 68 retained in confronting relationship by bolts 69 surrounding each of a plurality of radical sockets 70. A plurality of propeller blades 75 are arranged in a radial array and each includes an end shaft 74 captured within the appropriate socket 70 of the spider bracket 66. The propeller blades 75 have convex and concave surfaces 76 and 77 which act as rotary wings to cause propulsion when the propeller and spider assembly 65 is rotated by the hydraulically driven motor 6. The propeller blade angle can be varied by loosening the spider bracket bolts surrounding each socket 70 and manually turning the blade 75 to select a greater or lesser pitch for maximum efficiency of operation.

A means for controlling the depth or height of the hydraulically driven motor 6 is provided, and in the illustrated example, includes a winch arrangement attached to the bracket 8. A hand winch 80 with a crank handle 81 is operably connected to a cable 82 which is connected at its remote end to an I rod 83. The I rod 83 is connected to the bracket 8. The winch 80 is equipped with locking means such as a clutch or bracket whereby the bracket 8 can be raised or lowered to a selected depth position and there retained.

The hydraulic power unit 5 associated with the motor 6 comprises a pump 90 which provides for a pressurized flow of hydraulic fluid through lines 91. Flexible hydraulic fluid lines 92 and 93 provide for a flow of pressurized hydraulic fluid into the hydraulically driven motor 6 thereby propelling the motor 6 and rotating the propeller and spider assembly 65. A reservoir 95 provides a source of hydraulic fluid. The hydraulic power unit 5 includes an internal speed control such as a flow bypass valve 97 which provides for a partial bypass of hydraulic fluid flowing in lines 91 and circumventing direct engagement with the operative parts of the motor 6. By adjusting the amount of hydraulic fluid which bypasses the hydraulically driven motor 6, the speed of the hydraulically driven motor 6 can be selectively controlled.

It is to be understood that while certain forms of the present invention have been illustrated and described herein, it is not to be limited to the specific forms or arrangement of parts described and shown.

What is claimed and desired to secure by Letters Patent is as follows:

1. A liquid circulating apparatus for circulating fluid in a sewage treatment facility, thereby increasing the rate and efficiency of biodegradation of sewage being treated therein, and comprising:
   (a) an upright beam member for extending into a body of liquid to be treated;
   (b) upper and lower support means for holding said beam member in said body of liquid;
   (c) a U-shaped bracket mounted on said beam member and including spaced sidewalls and an endwall;
   (d) a submersible, hydraulically driven motor mounted on said bracket and extending outwardly of said endwall;
   (e) a propulsion means operably connected to and rotatably powered by said hydraulically driven motor to effect a circulating flow in said body of liquid; and
   (f) means mounting said bracket on said beam member including front and rear guides extending between said bracket sidewalls and capturing said beam member therebetween.

2. The apparatus set forth in claim 1 wherein:
   (a) said lower support means includes a ball and socket joint extending between a lower end of said beam member and a bottom surface of said body of liquid.

3. A liquid circulating apparatus for circulating fluid in a sewage treatment facility, thereby increasing the rate and efficiency of biodegradation of sewage being treated therein, and comprising:
   (a) an upright beam member for extending into a body of liquid and having upper and lower ends;
   (b) support means for said beam member providing for holding same in an upright attitude including:
      (1) a lower ball pivot at said lower end of said beam member wherein said lower end has a concave wall and rotatably engages a ball pivot extending from a bottom surface of said body of liquid;

(2) an upper support arm having a clamp means thereon; said clamp means providing for support of said beam member substantially near said upper end thereof; said clamp means adapted for permitting rotation of said beam member therein and restraint of said beam member in a selected position following adjustment by rotation;

(c) an acutation arm connected to said beam member providing a handle for rotation of said beam member about a longitudinal axis;

(d) a U-shaped bracket mounted on said beam member and including spaced sidewalls and an end wall;

(e) a submersible, hydraulically driven motor, mounted on said bracket and extending outwardly of said endwall;

(1) said hydraulically driven motor having flexible inlet and outlet lines connected thereto for providing flow of hydraulic fluid under pressure therethrough and providing for operation of said motor regardless of rotation and tilting of said beam member;

(f) a hydraulic pump system communicating with said hydraulically driven motor including:

(1) a pump providing for pressurized flow of hydraulic fluid;

(2) a reservoir providing a source of said hydraulic fluid;

(3) speed control means providing for control of fluid flow through said motor and thereby controlling the speed of said motor;

(4) fluid flow lines providing for flow communication among said pump, said speed control means, said reservoir and said motor;

(g) a propeller operably connected to and rotatably powered by said hydraulic motor to effect a directed circulating flow in said body of liquid and to create a vortex therein; whereby air is mixed with said liquid;

(h) a winch mounted on said beam member adjacent said upper end and connected to said bracket in order to selectively raise and lower said hydraulically driven motor to control depth of placement of said motor in said body of liquid; and (i) means mounting said bracket to said beam member including front and rear guides extending between said bracket sidewalls and capturing said beam member therebetween.

4. The apparatus set forth in claim 3 wherein:
(a) said upper support arm includes a telescoping member and a fastener for fixing said telescoping member at a selected amount of extension and retraction, thereby varying the inclination of said beam member.

5. The apparatus set forth in claim 3 wherein:
(a) said speed control means is a fluid flow bypass valve wherein a quantity of pressurized fluid flowing through said hydraulically driven motor is selectively controlled.

6. The apparatus set forth in claim 3 wherein:
(a) said propeller includes a plurality of blades each having an end shaft received in a spider bracket;
(b) said spider bracket is connected to said motor;
(c) said blades are variable in pitch by rotating said end shaft within said spider bracket, thereby controlling efficiency of said apparatus.

* * * * *